Figure 1:
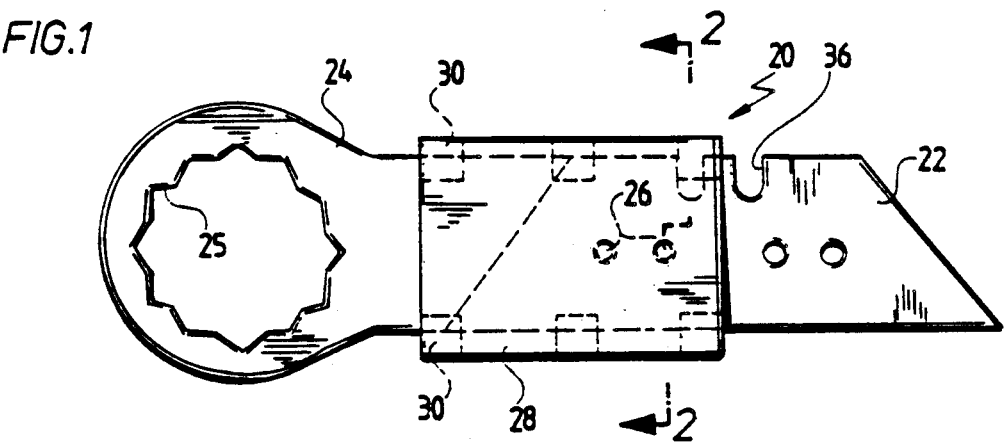

United States Patent [19]

Borkott et al.

[11] Patent Number: 4,989,320

[45] Date of Patent: Feb. 5, 1991

[54] KNIFE

[75] Inventors: Rudolf Borkott, Solingen; Gert Flachenecker, Leonberg; Gustav Schuhmacher, Stuttgart; Fritz Gramm, Stuttgart; Heinz Schueler, Stuttgart, all of Fed. Rep. of Germany

[73] Assignee: C. & E. Fein GmbH & Co., Fed. Rep. of Germany

[21] Appl. No.: 341,369

[22] Filed: Apr. 21, 1989

[30] Foreign Application Priority Data

Apr. 29, 1988 [DE] Fed. Rep. of Germany ....... 3814554

[51] Int. Cl.⁵ .......................... B26B 7/00; B26B 3/07; B26B 3/00
[52] U.S. Cl. .................................... 30/272.1; 30/162; 30/169
[58] Field of Search ................. 30/162, 151, 164, 125, 30/272.1, 293, 320, 335, 331, 314, 169; 83/651; 29/239

[56] References Cited

U.S. PATENT DOCUMENTS

| 1,779,474 | 10/1930 | Jackson | 30/272.1 |
| 2,681,502 | 6/1954 | Black | 30/294 |
| 2,912,843 | 11/1959 | Williams | 30/272.1 |
| 3,488,843 | 1/1970 | Tims, Jr. | 30/162 |
| 3,791,014 | 2/1974 | Perna | 30/294 |
| 3,853,495 | 12/1974 | Shire | 30/169 |
| 3,924,327 | 12/1975 | Edwards | 30/277 |
| 4,080,734 | 3/1978 | Barbour | 30/123 |
| 4,109,380 | 8/1978 | Anderson | 30/162 |
| 4,199,852 | 4/1980 | Ayers et al. | 29/239 |
| 4,215,475 | 8/1980 | Morford et al. | 30/272 |
| 4,286,383 | 9/1981 | Farden | 30/169 |
| 4,543,720 | 10/1985 | Grunikiewicz | 30/272 |
| 4,700,478 | 10/1987 | Mezger et al. | 30/294 |
| 4,748,743 | 6/1988 | Anderson et al. | 30/162 |
| 4,788,770 | 12/1988 | Simard | 30/169 |

FOREIGN PATENT DOCUMENTS 7623976 12/1976 Fed. Rep. of Germany .
3210212 6/1983 Fed. Rep. of Germany .
3324676 10/1984 Fed. Rep. of Germany .

Primary Examiner—Douglas D. Watts
Assistant Examiner—Paul M. Heyrana, Sr.
Attorney, Agent, or Firm—Barry R. Lipsitz

[57] ABSTRACT

In a knife for a cutting tool with a pivotally oscillating drive, in particular for severing joint seals or insulations on glass panes, with the knife comprising a holding part for attachment to a drive shaft and a blade part, in order to make replacement more economical when the knife is worn, it is proposed that the blade part be exchangeably attached to the holding part.

34 Claims, 6 Drawing Sheets

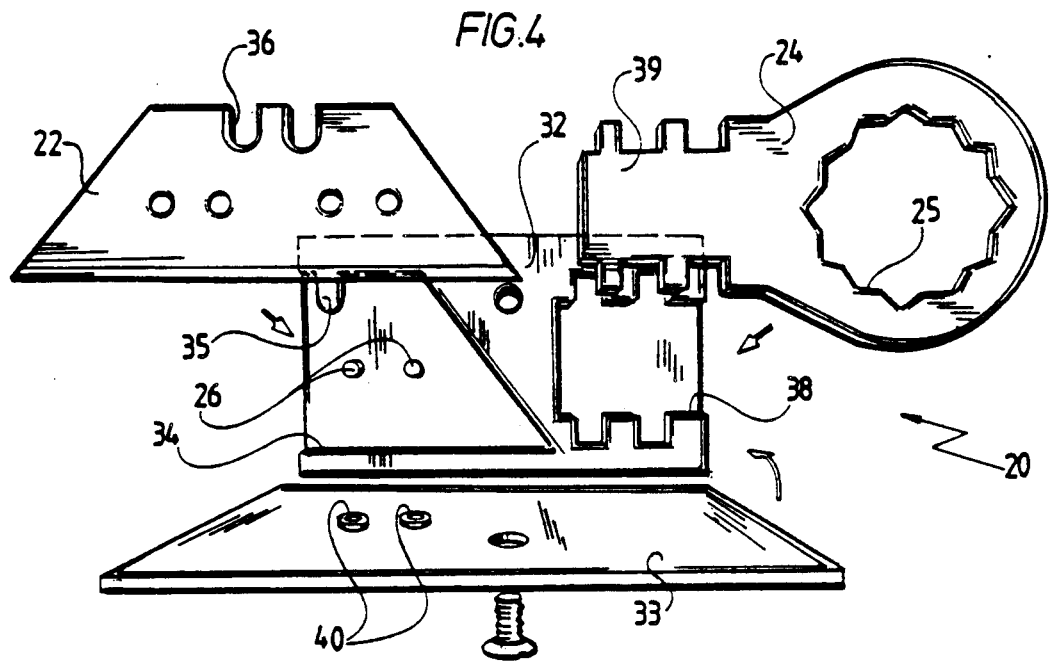
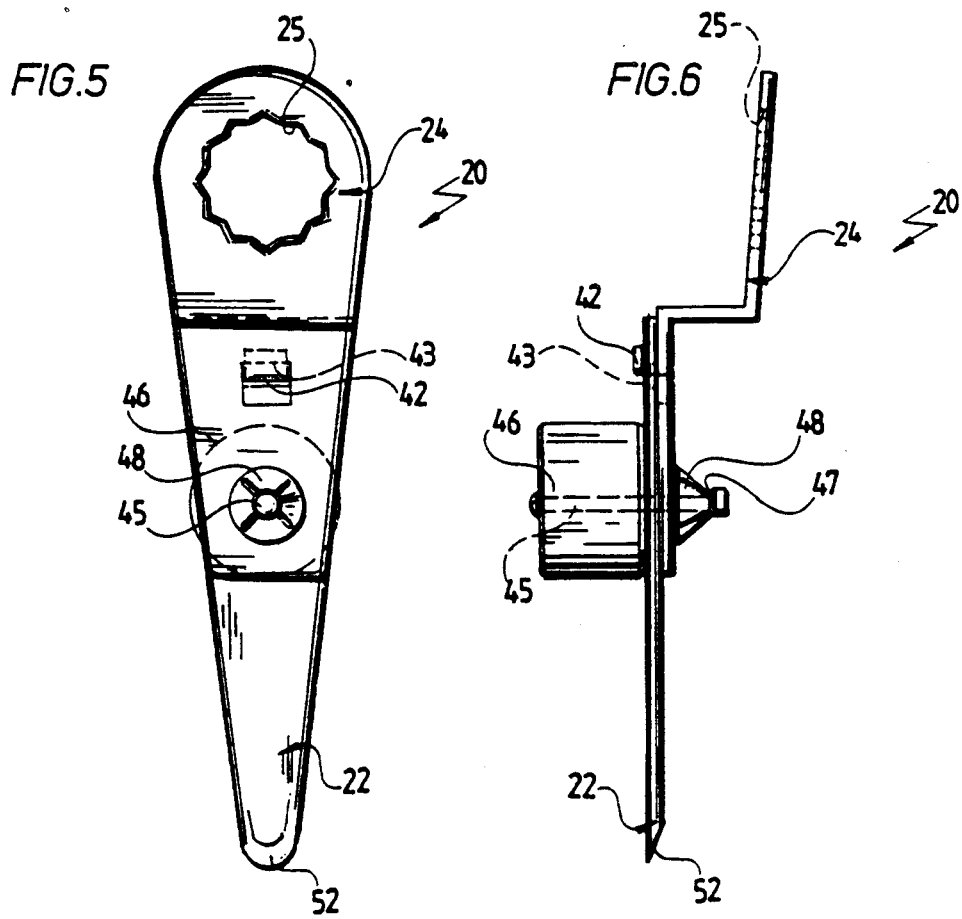

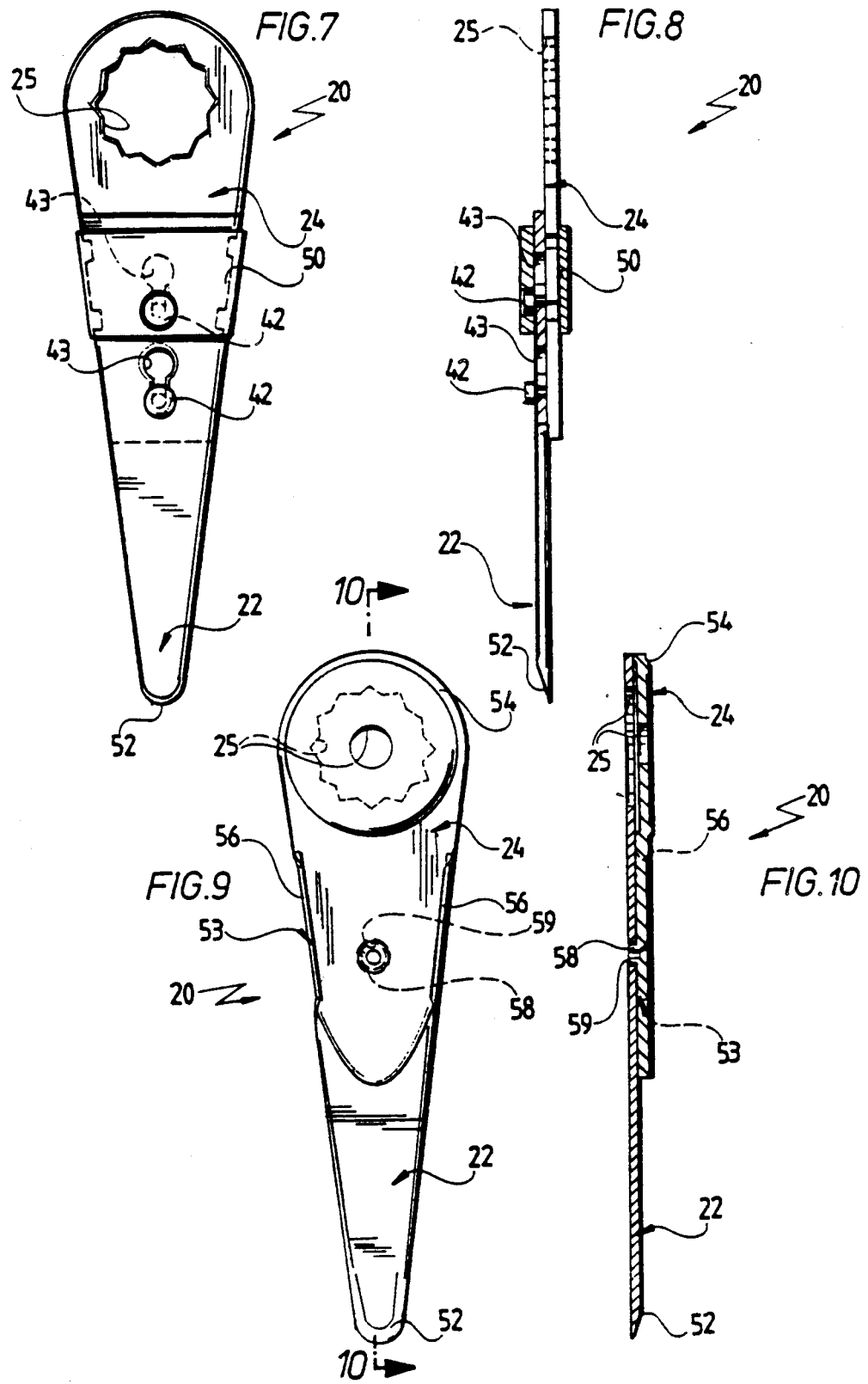

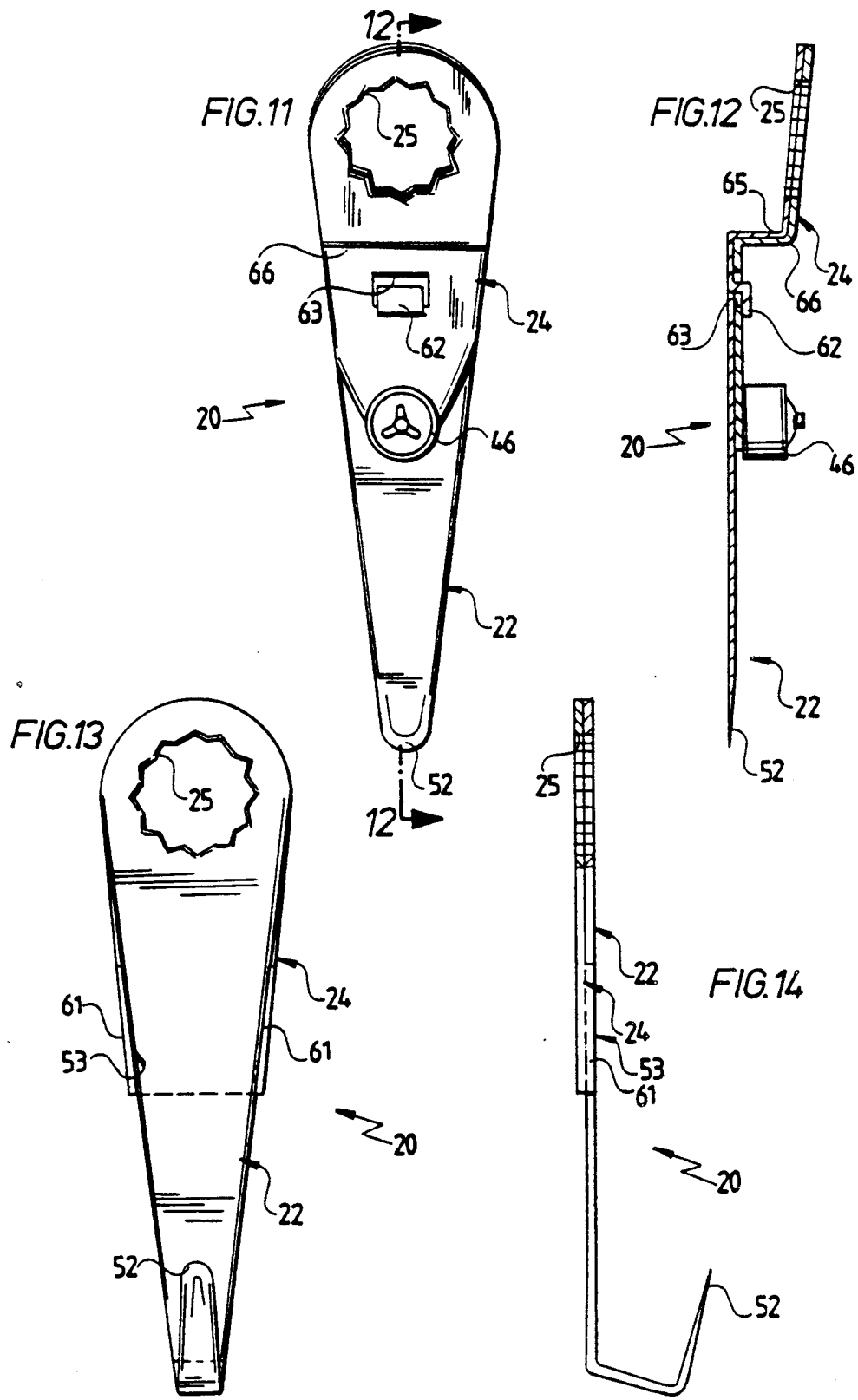

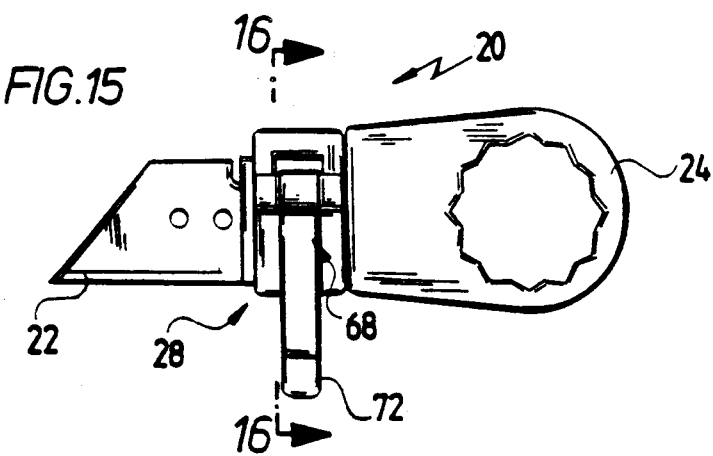
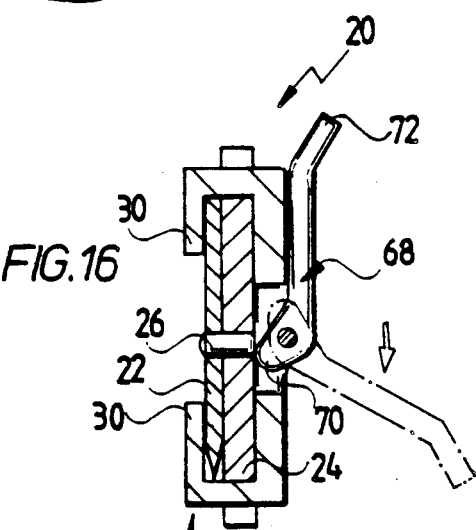
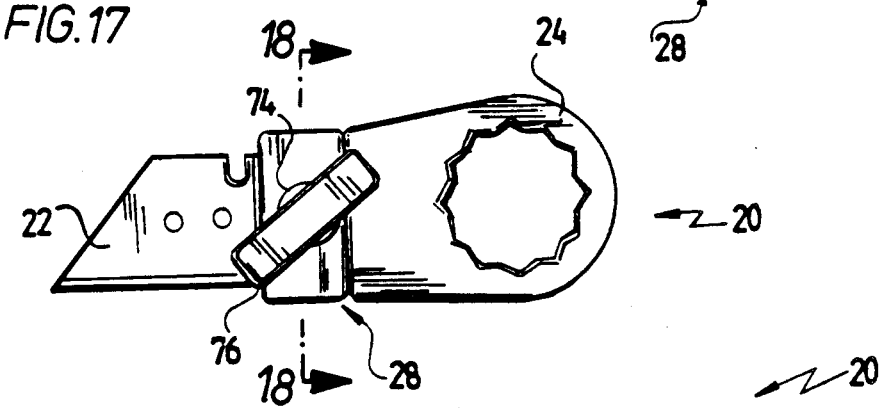
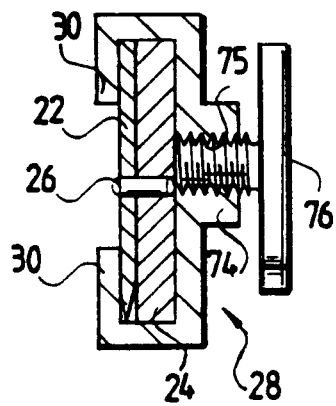

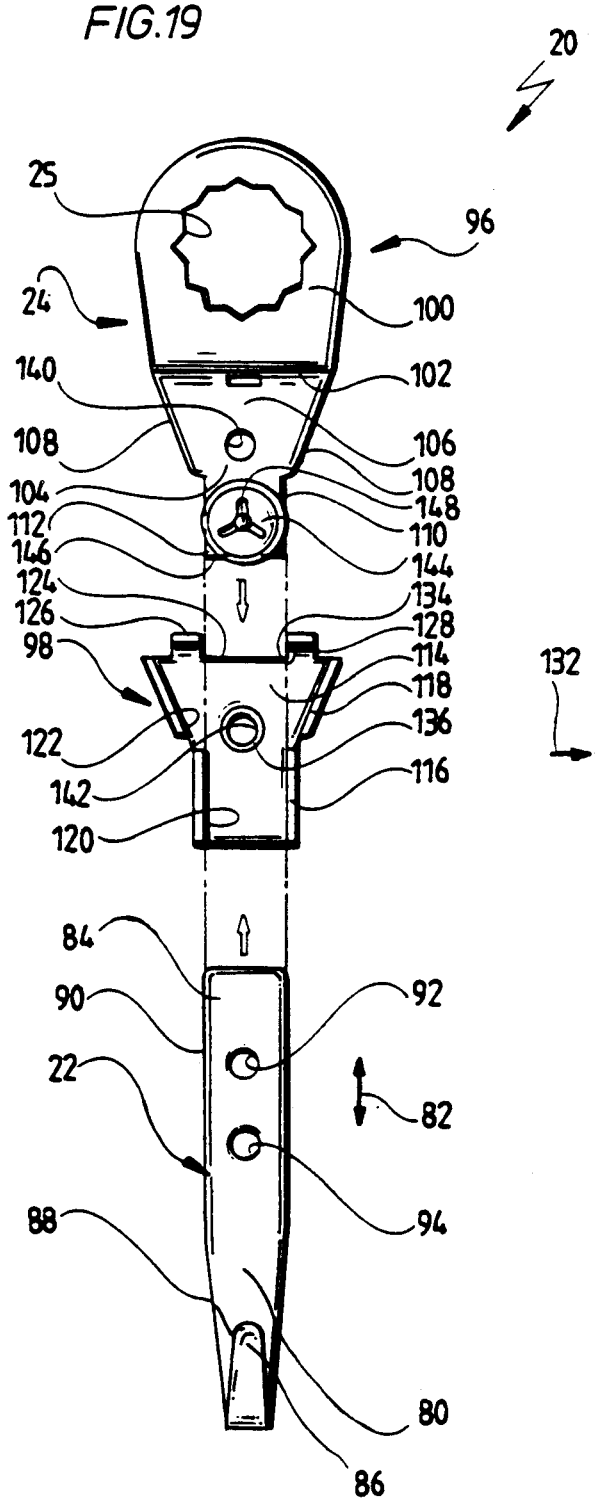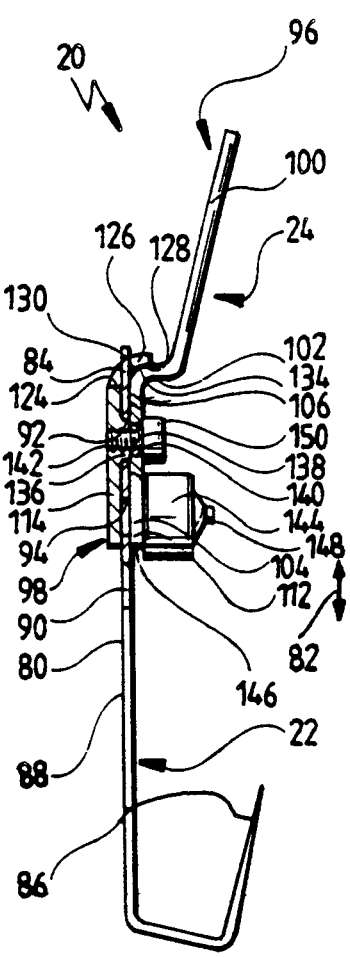

KNIFE

The invention relates to a knife for a cutting tool with a pivotally oscillating drive such as that known, for example, from German Utility Model DE-GM No. 80 31 084.5, in particular for severing joint seals or insulations on glass panes. The knife comprises a holding part for attachment to the drive and a blade part.

Such knives are known, for example, from EP-A-0 174 427 and EP-A-O141 035 and are used, in particular, for severing the adhesive layer of a bonded pane, for example in motor vehicles, where especially the windscreens are adhesively secured to the body in order to achieve a more favorable drag coefficient. The cutting tools with an oscillatory drive enable quite rapid severing of this adhesive layer and so such damaged panes are quickly replaced. Owing to the forces which occur during the severing of the adhesive layer, it is necessary to use a high-grade steel for the blade. Because of the forces which occur during the cutting and for other reasons, too, the knives have hitherto been of integral design. Consequently, the use of high-class materials makes the price of a replacement blade relatively high.

The object underlying the invention is, therefore, to make renewal of the knives more economical.

This object is achieved in accordance with the invention in a knife of the kind described at the beginning by the blade part being exchangeably attached to the holding part.

Knives with exchangeable blades are known from the prior art, for example, from EP-A 81 199, but these are all manually guided knives wherein forces peculiar to the knife for cutting tools with an oscillatory drive do not occur. Surprisingly, no problems arise from the blade part sinking into an adhesive layer where it receives no guidance whatever.

The greater cost efficiency of the inventive knife results, firstly, from the blade part being exchangeable, i.e., the component which must be discarded is now only part of the knife, and, secondly, from the holding part being made from a more favorably priced material as it need not necessarily consist of the high-quality blade steel.

In a particularly preferred embodiment of the invention, knife blades from carpet knives can be used as blade parts. These are not only very favorably priced but also obtainable everywhere. In addition, both ends of these carpet knife blades can be used by simply turning around the blade.

The blade part may be designed so that it overlaps only the end of the holding part facing away from the drive and is attached to it.

Alternatively, the blade part may extend over the entire length of the holding part, with a bore for receiving the drive shaft being provided in the blade part. The end of the blade part arranged opposite thereto then forms the actual cutting blade and protrudes beyond the holding part.

A further possibility of attaching the blade part to the holding part consists in using an intermediate piece to which the holding part or the blade part or both are exchangeably attached.

In a preferred embodiment of the knife, a support stop is arranged adjacent to the cutting edge of the blade part. Both the holding part and the blade part can be used for this purpose. The support stop is preferably made of soft material so that the knife can rest, for example, against the vehicle body during the cutting operation without the body being thereby damaged. In particular plastic is suitable as material, but it must have sufficient mechanical strength to withstand the mechanical stresses occurring during operation of the knife.

Preferred knives are angled twice with opposite orientation in their longitudinal direction so as to produce a cranked blade part. In this embodiment, the blade part may only be arranged on the cranked part of the holding part or it may also be of cranked configuration itself, in which case the blade part then preferably extends as far as the drive shaft of the cutting tool and is held thereon.

In the knife which is angled twice with opposite orientation in the longitudinal direction, the free end of the blade part preferably extends at a slight incline to the plane of the holding part in the region of the drive shaft, for example, at an angle of approximately 15 degrees.

In all cases, the support stop should have a width which is somewhat larger than the surface carrying the support stop in order to ensure that the knife can be guided by the support stop on the body in each work position.

In a further preferred variant of the knife, provision is made for the knife to be bent back in U-shaped configuration in the longitudinal direction. The U-shaped part of the knife may be formed by two angled portions with the same orientation or by a bend which is characterized by a radius. In particular, if this knife is used with a support stop, it is advantageous for the support stop to be arranged in the region of the bend of the knife. In this case, a continuous transition of the support stop into the angled portions of the knife is expedient.

The blade part and the holding part are preferably joined together by means of a guiding element and a securing element.

The guiding element may be of integral construction with the blade part or the holding part.

Similarly, the securing element may be of integral construction with the blade part or the holding part. An example of a securing element integrally formed on the blade part is a blade part which extends as far as the drive shaft and has a bore which receives the drive shaft of the cutting tool. The blade part is fixed flat on the holding part by means of the guiding element or elements while displacement of the blade part relative to the holding part is prevented by the securing element, i.e., by the bore in the shaft end of the blade part for receiving the drive shaft.

The guiding elements are preferably formed lengthwise at the sides of the blade part or the holding part, with the respective other part being embraced at least in its edge region by the guiding elements and thus held for displacement in the longitudinal direction.

Alternatively, the guiding elements may consist of hook parts which are attached to the holding part or blade part and engage recesses in the respective other part. The hook parts may, for example, be designed as pins with a head portion or as lugs which project from the plane of the holding part or blade part and have two angled portions with opposite orientation.

In preferred embodiments of the knives, the holding part and/or the blade part are of conical design, with the tapering end pointing towards the tip of the knife. With knives of such design which, in addition, preferably have cutting surfaces in both longitudinal directions of the blade part, insertion of the knife into the seal to be severed is particularly easy.

In an expedient embodiment of the knife, the securing element is attachable in a lockable manner in the region in which holding part and blade part overlap, with the securing element embracing the holding part and the blade part. In this construction of the securing element, it is preferable for the securing element to be simultaneously designed as support stop. In this case, it is also preferable for the securing element to be made of plastic.

The securing element is preferably fixed on the knife by clamping means such as, for example, an eccentric lever or a clamping screw.

In a particularly preferred embodiment, the holding part comprises a positive-connection receiving means for the fixing part of the blade part.

In particular, this positive-connection receiving means is designed such that it bears the fixing part in a rotationally fixedly connected manner.

Within the framework of the present invention, it is especially important that the blade part should be connected to the holding part without play. For this reason, it is advantageous for the receiving means to support the fixing part at at least two points spaced from each other in the longitudinal direction of the blade part. Owing to the stability, such a connection is also suitable for long-time use as it has a lesser tendency to deviate.

In addition, it may be advantageous for the receiving means to comprise a projection which extends through a recess in the fixing part.

A particularly high mechanical stability is achieved by the receiving means comprising contacting surfaces which rest against longitudinal side surfaces of the fixing part so that the force can be transmitted from the holding part to the blade part over surfaces which are as large as possible, which again reduces the danger of deviation.

In order to avoid any play, it is, furthermore, advantageous for the fixing part to be held with a precise fit by the contacting surfaces.

A further advantage is offered by an embodiment wherein the blade part is insertable in the receiving means in two different positions so that the feature of the exchangeability of the blade part may be simultaneously used to obtain two different or at least partially different types of knives with a holding part and one and the same blade.

A preferred possibility makes provision for the blade part to be insertable in the receiving means so as to extend to a different extent away from the holding part.

In all of the embodiments described so far, details were not given as to how the receiving means could be advantageously designed, more particularly, as to how the receiving means could be designed in order to achieve a connection between blade part and holding part which is as free from play as possible. In a preferred embodiment, the receiving means is formed by a base part of the holding part and by a supporting part securable on the base part, and the blade part is fixable between the supporting part and the base part, i.e., the blade part is clampable between the supporting part and the base part. With a receiving means of such design, the blade part may be prevented from being held with play by the base part and the supporting part being rotationally fixedly connectable by positive connection so that motion of the supporting part relative to the base part is not possible and play which would result therefrom is eliminated right from the start.

Here, one possibility is for the positive connection to be effected by means of positive-connection surfaces extending parallel to the longitudinal direction of the blade part and parallel to each other.

An alternative or additional possibility is for the positive connection to be effected by means of positive-connection surfaces extending conically towards each other in the longitudinal direction of the blade part. The particular advantage of the positive-connection surfaces which extend conically towards each other is that a snug fit is thereby achievable in a simple way.

To achieve such a snug fit of the positive-connection surfaces, provision is made in a preferred embodiment for the positive-connection surfaces to be acted upon in the direction of a snug fit by an inclined surface arranged on the base part or on the supporting part and by a slidable part arranged on the supporting part or on the base part so as to slide on the inclined surface.

Here, it is particularly expedient for the inclined surface to extend at an incline to a direction in which the supporting part is put on.

Furthermore, in order for the snug fit to be maintained by an elastic component of force it is advantageous for the slidable part which slides on the inclined surface to be elastically deformable.

Regarding provision of a support stop on the inventive knife, it is advantageous for the holding part to carry the support stop as a lowering of costs can be achieved by only the exchangeable blade part having to be supplied as replacement part and the support stop being further usable together with the holding part.

For manufacturing reasons, it is likewise particularly expedient for the support stop to be carried by the base part.

Figure 2:
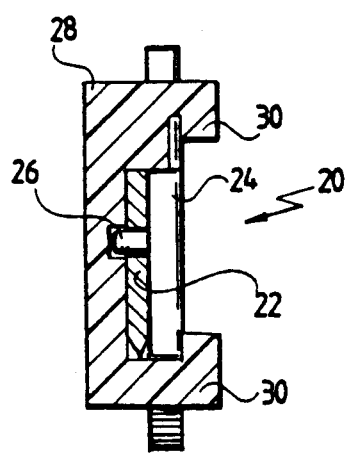
Figure 3:
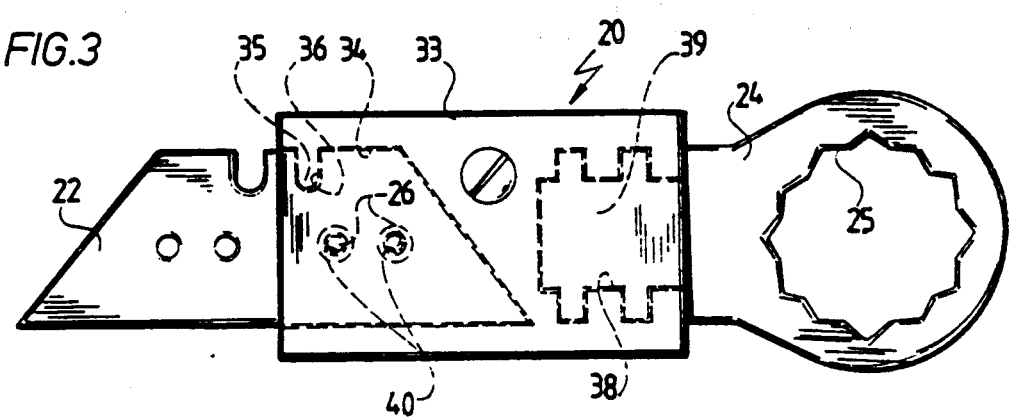

Further features and advantages are to be found in the following description and in the drawings of several embodiments which show:

FIG. 1 a plan view of a first embodiment of an inventive knife;

FIG. 2 a sectional view along line 2—2 in FIG. 1;

FIG. 3 a plan view of a second embodiment of an inventive knife;

FIG. 4 an exploded view of component parts of the inventive knife of FIG. 3;

FIG. 5 a plan view of a third embodiment of an inventive knife;

FIG. 6 a side view of the knife of FIG. 5;

FIG. 7 a plan view of a fourth embodiment of an inventive knife;

FIG. 8 a partially sectional side view of the knife of FIG. 7;

FIG. 9 a plan view of a fifth embodiment of an inventive knife;

FIG. 10 a section along line 10—10 in FIG. 9;

FIG. 11 a plan view of a sixth embodiment of an inventive knife;

FIG. 12 a section along 12—12 in FIG. 11;

FIG. 13 a plan view of a seventh embodiment of an inventive knife;

FIG. 14 a partially sectional side view of the knife of FIG. 13;

FIG. 15 a plan view of an eighth embodiment of an inventive knife;

FIG. 16 a section along line 16—16 in FIG. 15;

FIG. 17 a plan view of a ninth embodiment of an inventive knife;

FIG. 18 a section along line 18—18 in FIG. 17;

FIG. 19 an exploded plan view of a tenth embodiment of an inventive knife; and

FIG. 20 a longitudinal section through the tenth embodiment in the assembled state.

FIGS. 1 to 4 show an inventive knife 20 which is of such construction that a normal carpet knife is usable as blade part 22.

In the knife 20 illustrated in FIGS. 1 and 2, the blade part 22 is attached to a holding part 24 which includes a polygonal bore 25 for receiving a drive shaft, not illustrated, of a cutting tool.

Two pins 26 are provided at the free end of the holding part 24 pointing away from the drive shaft. These pins 26 receive the blade part 22 originating from a carpet knife with its complimentary bores and provide a bearing for it. The blade part 22 rests flat on the holding part 24. At this end, the holding part will preferably have a width which is identical with the width of the blade part 22.

The blade part is secured against rotation relative to the holding part 24 by the two pins 26. A securing bracket 28 prevents release of the blade part 22 from the pins 26 and engages over the blade part 22 including the pins 26 and the edges on either side of the holding part 24 in the manner of a cuff.

The securing bracket 28 is preferably made of plastic with sufficient elasticity to enable the securing bracket to snap into position over the holding part 24 and the blade part 22 with its noses 30 engaging over the holding part 24. The securing bracket 28 may simultaneously serve as supporting part of the guide of the knife. The use of plastic as material for the securing bracket 28 suffices because the substantial forces occurring during use of the knife are absorbed by the two pins 26, and the securing bracket 28 serves only to fix the blade part 22 on the holding part 24.

FIGS. 3 and 4 show a further variant of a knife 20 using a blade part 22 in the form of a blade which originates from a normal carpet knife.

In this embodiment, the holding part 24 is connected to the blade part 22 by an intermediate piece 32 and a securing plate 33. The intermediate piece 32 preferably comprises a recess 34 enabling an end of the blade part 22 to be received therein in a positively connected manner. The recess 34 has a projection 35 which engages a complementary notch 36 in the edge of the blade part 22. In this embodiment, too, two pins 26 are additionally provided for the blade or the blade part 22 to be positioned thereon. The depth of the recess 34 corresponds to the thickness of the blade part 22 so that the blade surface terminates flush with the surface of the intermediate piece 32 when the blade 22 is inserted.

Opposite the recess 34, the elongate intermediate piece 32 comprises a toothed recess 38 which receives a complimentarily shaped end 39 of the holding part 24. The toothing of the recess or the end 39 may be designed so that there is only one single possible position when the holding part 24 is inserted into the intermediate piece 32. After insertion of the blade part 22 and the holding part 24 into the recesses 34 and 38 of the intermediate piece 32, the securing plate 33 is placed thereon and screwed to the intermediate piece 32. The securing plate 33 preferably comprises two bores 40 into which the pins 26 protrude, thereby preventing rotation of the securing plate relative to the intermediate piece 32. In this way, unintentional release of the connection of blade part 22 and intermediate piece 32 or of holding part 24 and intermediate piece 32 is reliably avoided.

The holding part 24 is provided at its end opposite the end 39 with a bore 25 which is preferably of polygonal design and thus enables positive connection with the drive shaft.

FIGS. 5 to 14 show knives 20 with specially manufactured blade parts 22.

A cranked embodiment of the knife 20 is illustrated in FIGS. 5 and 6. Herein, the holding part 24 is divided by the cranking into two regions. The one region comprises the bore 25, preferably of polygonal design, whereas the other region accommodates guiding and securing elements for attachment of the blade part 22 to the holding part 24. A hook 42 punched out of the holding part and engaging a corresponding opening 43 in the blade part 22 is provided as guiding element. In this embodiment, the blade part 22 is secured on the holding part 24 by a bolt 45 carrying at its one end a supporting roller 46, the diameter of which is preferably selected so that the supporting roller protrudes at the circumference over the side edges of the blade part 22 and of the holding part 24.

With its other end, the bolt 45 is inserted into corresponding aligned bores of the blade part 22 and of the holding part 24, with the protruding part of the bolt 45 carrying an annular groove 47 at its end. A clamping disc 48 is then pushed over this free end of the bolt 45 and its resilient elements snap into the annular groove 47.

FIGS. 7 and 8 show a flat knife 20 which is not of cranked configuration. Herein, the holding part 24 carries two hook parts 42 which, in this case, consist of pins carrying flat round heads. The blade part 22 comprises two elongate holes, each having at one end thereof a circular extension through which the hook parts 42 can be pushed. In the event of displacement of the blade part relative to the holding part 24, the spacing of the blade part 22 relative to the holding part 24 is fixed, while displacement of the two parts towards each other in the longitudinal direction of the knife is prevented by a securing clip 50 which embraces the holding part 24 and the blade part 22 and is held in its position with respect to the longitudinal direction of the knife 20 by a hook part 42.

A further variant of the knife 20 is shown in FIGS. 9 and 10 where the blade part 22 is divided up into three regions, namely an actual blade 52, a guide 53 and an end region 54. The guide 53 of the blade part 52 has upwardly bent side regions 56 which embrace the holding part 24 in the region of its edges. The sheer forces between holding part 24 and blade part 22 which occur during the pivotally oscillating motion of the knife 20 are mainly absorbed by a pin 58 provided in the holding part 24 and engaging a bore 59 in the blade part 22. In this embodiment, the end region 54 of the blade part 22 has a polygonal bore 25 in which the drive shaft of the cutting tool engages. The corresponding end region of the holding part 24 which overlaps this end region 54 of the blade part 22 may likewise have a polygonal bore or, alternatively, a round bore in which a corresponding end of the drive shaft is guided. FIGS. 13 and 14 show corresponding guidance of blade part 22 and holding part 24 where side regions 61 embrace the blade part 22 and support it in a planar manner on the holding part 24. In this embodiment of the inventive knife 20, too, securing of holding part 24 relative to blade part 22 during assembly of the knife on the drive shaft is achieved by, for example, in the example shown in FIG. 13 both the blade part and the holding part having aligned polygonal bores in which the drive shaft of the cutting tool is inserted.

Furthermore, FIGS. 13 and 14 show a variant with a blade 52 of U-shaped bent configuration which is preferred in certain cases of application.

In the embodiment of FIGS. 11 and 12, guidance of the blade part on the holding part 24 is achieved by a hook 62 which is punched out of the blade part 22 and engages an opening 63 in the holding part 24. In this embodiment, holding part 24 and blade part 22 are both cranked and extend substantially parallel to each other. The cranked regions 65, 66 of blade part 22 and holding part 24 serve in addition to the hook 62 to fix the blade part relative to the holding part by abutting on each other in a positively connected manner. The bores of blade part and holding part receiving the drive shaft of the cutting tool are again of polygonal design and simultaneously serve as means for securing the two knife parts to each other in the assembled state on the cutting tool.

The holding part 24 is additionally provided with a supporting roller 46 which is rotatably arranged in an end region facing the blade part 22.

Finally, FIGS. 15 to 18 show further embodiments of the inventive knives wherein standard carpet knives are usable as blade parts 22.

The design of these knives 20 corresponds, in principle, to that shown in FIG. 1. The carpet knife or blade part 22 is held on the holding part 24 by pins 26. In the region overlapping the blade part 22, the holding part 24 is of the same width as the blade part 22. In this overlapping region, a securing bracket 28 engages over the holding part 24 and the blade part 22 and prevents release of the blade part from the pins 26.

In order to fix the securing bracket 28 on the knife 20 and thus simultaneously the blade part 22 on the holding part 24, the bracket 28 illustrated in FIGS. 15 and 16 comprises an eccentric lever 68. In the position drawn in continuous lines in FIG. 16, the eccentric lever 68 presses with its cam 70 the holding part 24 and the blade 22 resting thereagainst against the noses 30 of the securing bracket 28. In this position, the lever arm 72 of the eccentric lever 68 rests substantially flat on the securing bracket 28.

In the position shown in dot-and-dash lines in FIG. 16, bracket 28 can be withdrawn from the holding part 24 and the blade part 22 to enable turning or replacement of the carpet knife.

The embodiment shown in FIGS. 17 and 18 differs from that previously described by the way in which the securing bracket 28 is fixed. An extension 74 having an internal thread 75 machined therein is formed on the top side of the bracket 28. The extension 74 with the internal thread receives a thumb screw 76 which, in the tightened state (FIG. 18), like the eccentric lever 68 of the previous embodiment, presses the holding part 24 against the abutting blade part 22 and the noses 30 of the bracket 28.

To replace the carpet knife or blade part 22, the thumb screw 76 needs only to be released so that the bracket 28 can be removed from holding part 24 and blade part 22.

The shapes of the knives shown in the Figures are, of course, only exemplary and may be differently designed in accordance with the purpose for which they are intended. In certain cases, for example, a crescent-shaped configuration will be preferred for the knives.

The holding part and/or blade part may, of course, also be cranked in a wide variety of embodiments and not only in those shown. Similarly, provision of a supporting roller is possible in all of the embodiments shown and not only in that illustrated in FIGS. 5 and 6.

Also in the embodiments in which no separate securing clip is necessary and in which the securing of the holding part 24 relative to the blade part 22 is already released by the assembly on the drive shaft, it is possible to mount a plastic clip in the region of the blade part 22 or in the region in which holding part 24 and blade part 22 overlap in order to provide a supporting part for guidance of the knife on the article to be worked on.

Similarly, exchange of the guiding and securing elements such as, for example, the hook/eyelet combinations or also the guides provided at the sides is left to the discretion of those skilled in the art and is not limited to the embodiments shown in the Figures.

A tenth embodiment of an inventive knife designated in its entirety 20 is illustrated in FIGS. 19 and 20 and comprises in exactly the same way as the previous embodiments a blade part 22 and a holding part 24, with the blade part 22 being exchangeably connectable to the holding part 24.

To this end, the blade part 22 is provided with a cutting part 80 which extends in the longitudinal direction 82 of the blade part 22 from a fixing part 84 which is integrally connected and also in alignment therewith. The cutting part 80 tapers conically to a tip 86 and is optionally provided either on one side or on both sides with a cutting edge 88.

The fixing part 84 located opposite the tip 86 and integrally adjoining the cutting part 80 is made of flat material of the same thickness as the cutting part 80 and has the shape of a flat, right parallelepiped with longitudinal side surfaces 90 extending parallel to the longitudinal direction 82 and also to each other.

Furthermore, the fixing part is provided with round recesses 92 and 94 located one behind the other in the longitudinal direction 82 and arranged at the center between the longitudinal side surfaces.

The holding part 24 comprises a base part 96 and a supporting part 98 connectable to the base part 96. The base part 96 has an attachment leg 100 which includes the polygonal bore 25 for attachment of the knife 20 to the drive shaft of an oscillating vibratory drive. Starting from the attachment leg 100, the base part 96 is bent twice in opposite directions so that it has an intermediate leg 102 bent relative to the attachment leg 100 as well as a holding leg 104 bent at an angle of approximately 90 degrees relative to the intermediate leg.

The supporting part 98 is positionable on the base part 96 so as to substantially engage over the holding leg 104. In order to connect the supporting part 98 rotationally fixedly and positively to the holding leg 104, a central region 106 of the holding leg 104 adjoining the intermediate leg 102 is designed so as to comprise lateral positive-connection surfaces 108 extending conically away from the intermediate leg 102 towards each other. Adjoining these positive-connection surfaces 108 are positive-connection surfaces 110 which extend parallel to each other and laterally delimit an end region 112 of the holding leg 104.

The entire base part 96 is preferably integrally formed from flat material so that the positive-connection surfaces 108 and 110 of the holding leg are formed by the narrow side edges of the flat material.

The supporting part 98 comprises a base plate 114 likewise made of flat material and corresponding in shape substantially to the shape of the holding leg 104 with the difference that front holding lugs 116 and rear holding lugs 118 which project vertically from the plane of the base plate are formed at the sides of the base plate. Owing to the essentially identical shape of the base plate 114 and the holding leg 104, the front holding lugs 116 extend parallel to each other and the rear holding lugs 118 extend conically towards each other in the direction of the front holding lugs 116. The front holding lugs 116 thus form on their inner sides facing each other front positive-connection surfaces 120 which are provided to engage in a positively connected manner the positive-connection surfaces 110 of the holding leg 104, and the rear holding lugs 118 form at their inner surfaces facing each other rear positive-connection surfaces 122 which are provided for engagement with the positive-connection surfaces 108 of the holding leg 104 so that, in total, the supporting part 98 and the base part 96 are rotationally fixedly and positively connected in the assembled state.

In particular to enable fitting engagement of the rear positive-connection surfaces 122 with the positive-connection surfaces 108, the supporting part 98 additionally comprises claws 126 on its rear side 124 extending approximately parallel to the intermediate leg 102 in the assembled state of the holding part 24. When the supporting part 98 is put on in the putting-on direction 132, the claws 126 are capable of sliding with their outer ends 128 on a rounded surface 130 of the base part 96 facing the contacting part at the transition from the holding leg 104 to the intermediate leg 102 and hence endeavor to displace the supporting part 98 in the direction towards the intermediate leg 102 so that the positive-connection surfaces 122 and 108 which expand in this direction enter into play-free engagement with each other. In order to maintain this play-free position, the claws 126 exhibit slight elasticity so that after sliding only the rounded surface 130, they are capable of constantly holding the supporting part 98 in this play-free position.

The supporting part 98 engaging over the holding leg 104 forms with it a receiving means for the fixing part 84 of the blade part 22, with the fixing part 84 coming to rest between the supporting part 98 and the holding leg 104. The positive-connection receiving means is formed, firstly, by the front holding lugs 116 which with their regions of the front positive-connection surfaces 120 rising directly above the base plate 114 form contacting surfaces which cooperate with the longitudinal side surfaces 90 of the fixing part. Secondly, the claws 126 are arranged at such a distance from each other that their inside surfaces facing each other form further contacting surface 134 between which the longitudinal side surfaces 90 of the fixing part 84 lie in the assembled state.

In order to fix the fixing part 84 in the longitudinal direction in the supporting part 98, the latter is provided with a toroidal member 136 which rises from the base plate 114 and the outer surface of which fits into the recess 92 or 94. Independently of whether the toroidal member 136 engages the recess 92 or the recess 94, the fixing part 84 is always fixed by the toroidal member 136 in the supporting part in the longitudinal direction 82 in such a way that the longitudinal side surfaces 90 rest against both the front positive-connection surfaces 120 and the contacting surfaces 134 between the claws 126.

To assemble the knife, the blade part 22 with the fixing part 84 is first placed into the supporting part 98 so that the toroidal member 136 extends through the recess 92 or the recess 94, and the base part 96 is then placed thereon such that the holding leg 104 presses the fixing part 84 against the base plate 114 of the supporting part 98. In order to clamp the fixing part 84 between the base plate 114 and the holding leg 104 and to firmly connect the supporting part 98 with the holding leg 104, a screw 138 extends through the holding leg 104 in a bore 140 and is screwable with its thread into an internal thread 142 cut in an inner side of the toroidal member 136. To this end, the height to which the toroidal member 136 rises from the base plate 114 is so dimensioned that when the fixing part 84 is placed thereon it does not protrude above the fixing part 84 in the direction of the holding leg 104.

As is apparent from FIG. 20, the supporting part 98 is preferably placed on the side of the holding leg 104 located opposite to the direction in which the intermediate leg 102 rises from the holding leg 104.

In order to provide an additional support for the tenth embodiment of the knife, a supporting roller 144 is arranged in the end region 112 of the holding leg 104. The supporting roller 114 protrudes beyond a front edge 146 of the end region 112 facing the tip 86 of the blade part 22 and is rotatably mounted on a pin 148 which rises from the holding leg 104 in the same direction as the intermediate leg 102.

The arrangement of the supporting roller 114 and the screw 138 with its head 150 on the side on which the intermediate leg 102 also rises from the holding leg 104 ensures that the inventive knife 20 is usable without striking the vehicle body in a disturbing manner.

The present disclosure relates to the subject matter disclosed in German application No. P 38 14 554.5 of Apr. 29, 1988, the entire specification of which is incorporated herein by reference.

What is claimed is:

1. Knife for a cutting tool with a pivotally oscillating drive, in particular for severing joint seals or insulations on glass panes, said knife comprising a holding part for attachment to a dive shaft and a blade part, wherein said blade part is exchangeably coupled to said holding part.

2. Knife as defined in claim 1, wherein said holding part comprises a first end for attachment to said drive shaft and a second end for coupling to said blade part, and said blade part is coupled to the second end of said holding part and points away from said drive shaft.

3. Knife as defined in claim 1, characterized in that said holding part comprises a bore for receiving said drive shaft.

4. Knife as defined in claim 1, characterized in that said blade part (22) is attachable to said holding part (24) by means of an intermediate piece (32).

5. Knife as defined in claim 1, characterized in that said knife comprises a support stop adjacent to a cutting part of said blade part.

6. Knife as defined in claim 5 wherein said support stop is a roller.

7. Knife as defined in claim 6 wherein said roller comprises a soft material.

8. Knife as defined in claim 1, characterized in that said knife is angled twice with opposite orientation in the longitudinal direction.

9. Knife according to claim 1, characterized in that said knife (20) is of U-shaped bent configuration in the longitudinal direction.

10. Knife as defined in claim 1, characterized in that said blade part and said holding are joined together by means of a guiding element and a securing element.

11. Knife as defined in claim 10, characterized in that said guiding element (56, 61) is of integral construction with said blade part (22) or said holding part (24).

12. Knife as defined in claim 10, characterized in that said securing element is of integral construction with said blade part or said holding part.

13. Knife as defined in claim 10, characterized in that said guiding elements (56, 61) are formed lengthwise at the sides of said blade part (22) or said holding part (24) and embrace the respective other part at least in the edge region and hold it for displacement in the longitudinal direction.

14. Knife as defined in claim 10, characterized in that said guiding elements comprise hook parts (42, 62) on said holding part (24) or said blade part (22) which engage recesses (43, 63) in the respective other part.

15. Knife as defined in claim 10, characterized int hat said securing element is attachable in a lockable manner in the region in which said holding part and said blade part overlap, with said securing element embracing said holding part and said blade part.

16. Knife as defined in claim 10, characterized in that said securing element (50) forms the support stop.

17. Knife as defined in claim 1, characterized in that said holding part and/or said blade part are of conical design, with the tapering end pointing towards the tip of said knife.

18. Knife as defined in claim 1, characterized in that said holding part comprises a positive-connection receiving means for a fixing part of said blade part.

19. Knife as defined in claim 18, characterized in that said receiving means bears said fixing part in a rotationally fixedly connected manner.

20. Knife as defined in claim 18, characterized in that said receiving means supports said fixing part at least two points spaced from each other in the longitudinal direction of said blade part.

21. Knife as defined in claim 18, characterized int hat said receiving means comprises a projection which extends through a recess in said fixing part.

22. Knife as defined in claim 18, characterized in that said receiving means comprises contacting surfaces which rest against longitudinal side surfaces of said fixing part.

23. Knife as defined in claim 22, characterized in that said fixing part is held with a precise fit by said contacting surfaces.

24. Knife as defined in claim 18, characterized in that said blade part is insertable in said receiving means in two different positions.

25. Knife as defined in claim 24, characterized in that said blade part is insertable into said receiving means so as to extend to a different extent away from said holding part.

26. Knife as defined in claim 18, characterized in that said receiving means is formed by a base part of said holding part and by a supporting part securable on said base part, and in that said blade part is fixable between said supporting part and said base part.

27. Knife as defined in claim 26 characterized in that said base part and said supporting part are rotationally fixedly connectable by positive connection.

28. Knife as defined in claim 27, characterized in that the positive connection is effected by means of positive-connection surfaces extending parallel to the longitudinal direction of said blade part and parallel to each other.

29. Knife as defined in claim 28, characterized in that said positive-connection surfaces can be acted upon in the direction of a snug fit by an inclined surface arranged on said base part or on said supporting part and a slidable part arranged on said supporting part or on said base part.

30. Knife as defined in claim 29, characterized in that said inclined surface extends at an incline to a putting-on direction of said supporting part.

31. Knife as defined in claim 29, characterized in that said slidable part which slides onto said inclined surfaces is elastically deformable.

32. Knife as defined in claim 27, characterized in that the positive connection is effected by means of positive-connection surfaces extending conically towards each other in the longitudinal direction of said blade part.

33. Knife as defined in claim 1, characterized in that said holding part carries the support stop.

34. Knife as defined in claim 33, characterized in that said support stop is carried by said base part.

* * * * *

UNITED STATES PATENT AND TRADEMARK OFFICE
CERTIFICATE OF CORRECTION

PATENT NO. : 4,989,320
DATED : February 5, 1991
INVENTOR(S) : Borkott, et al.

It is certified that error appears in the above-identified patent and that said Letters Patent is hereby corrected as shown below:

In Claim 1, column 10, line 46, "dive" is changed to -- drive -- .

In Claim 15, column 11, line 24, "int hat" is changed to -- in that -- .

In Claim 21, column 11, line 46, "int hat" is changed to -- in that -- .

Signed and Sealed this

Twenty-eighth Day of July, 1992

Attest:

DOUGLAS B. COMER

*Attesting Officer*  *Acting Commissioner of Patents and Trademarks*